United States Patent
Morrill et al.

(10) Patent No.: US 8,850,406 B1
(45) Date of Patent: Sep. 30, 2014

(54) DETECTING ANOMALOUS APPLICATION ACCESS TO CONTACT INFORMATION

(75) Inventors: Daniel L. Morrill, Mountain View, CA (US); Stuart Teng, Mountain View, CA (US)

(73) Assignee: Google Inc., Mountain View, CA (US)

( * ) Notice: Subject to any disclaimer, the term of this patent is extended or adjusted under 35 U.S.C. 154(b) by 321 days.

(21) Appl. No.: 13/440,628

(22) Filed: Apr. 5, 2012

(51) Int. Cl.
*G06F 9/44* (2006.01)

(52) U.S. Cl.
USPC ............................ 717/131; 717/127; 717/124

(58) Field of Classification Search
None
See application file for complete search history.

(56) References Cited

U.S. PATENT DOCUMENTS

| | | | | |
|---|---|---|---|---|
| 5,778,227 | A * | 7/1998 | Jordan | 1/1 |
| 5,925,104 | A * | 7/1999 | Elbers et al. | 709/231 |
| 6,453,469 | B1 * | 9/2002 | Jystad | 717/174 |
| 6,567,828 | B2 * | 5/2003 | Inohara et al. | 707/809 |
| 6,615,217 | B2 * | 9/2003 | Rosensteel et al. | 1/1 |
| 6,698,012 | B1 * | 2/2004 | Kossatchev et al. | 717/126 |
| 6,996,805 | B2 * | 2/2006 | Achlioptas et al. | 717/124 |
| 7,024,262 | B2 * | 4/2006 | Yokota et al. | 700/96 |
| 7,131,120 | B2 * | 10/2006 | Veselov | 717/164 |
| 7,340,648 | B2 * | 3/2008 | Asauchi | 714/26 |
| 7,404,180 | B2 * | 7/2008 | Wedel et al. | 717/128 |
| 7,484,221 | B2 * | 1/2009 | Rivera et al. | 717/131 |
| 7,584,455 | B2 * | 9/2009 | Ball | 717/124 |
| 7,712,086 | B2 * | 5/2010 | Hughes et al. | 717/131 |
| 7,739,602 | B2 * | 6/2010 | Feng et al. | 715/733 |
| 7,822,620 | B2 * | 10/2010 | Dixon et al. | 705/1.1 |
| 7,849,267 | B2 * | 12/2010 | Lam et al. | 711/115 |
| 7,900,201 | B1 * | 3/2011 | Qureshi et al. | 717/174 |
| 7,904,956 | B2 * | 3/2011 | Golan et al. | 717/127 |
| 7,917,629 | B2 * | 3/2011 | Werner | 709/227 |
| 7,930,681 | B2 * | 4/2011 | Kloeffer et al. | 717/120 |
| 7,937,475 | B2 * | 5/2011 | Denton et al. | 709/226 |
| 7,996,814 | B1 * | 8/2011 | Qureshi et al. | 717/131 |
| 8,001,527 | B1 * | 8/2011 | Qureshi et al. | 717/131 |
| 8,005,950 | B1 * | 8/2011 | Ashcraft et al. | 709/224 |
| 8,010,844 | B2 * | 8/2011 | Lee et al. | 717/124 |
| 8,015,272 | B2 * | 9/2011 | Yoshiuchi et al. | 709/223 |
| 8,239,836 | B1 * | 8/2012 | Franz et al. | 717/127 |
| 8,245,194 | B2 * | 8/2012 | Atkin et al. | 717/127 |

(Continued)

OTHER PUBLICATIONS

Anderson, et al., "Detecting Unusual Program Behavior Using the Statistical Component of the Next-generation Intrusion Detection Expert System (NIDES)"; 1995, Computer Science Laboratory of SRI International, Published online; [retrieved on Jul. 10, 2012]; Retrieved from Internet <URL: http://www.sdl.sri.com/papers/5sri/5sri.pdf>; pp. 1-77.*

(Continued)

*Primary Examiner* — Xi D Chen
(74) *Attorney, Agent, or Firm* — McDonnell Boehnen Hulbert & Berghoff LLP

(57) ABSTRACT

A client device may install an application. The client device may also maintain a shared set of contact information separate from the application. If the client device determines that, within a fixed time period, the application has read from the shared set of contact information, but has not written a threshold extent of data to the shared set of contact information, the client device may indicate to at least one of the user interface of client device and a server device that the application is exhibiting anomalous behavior. If the server device receives such indications from at least a threshold number of client devices, the server device may instruct the client device to disable or uninstall the application.

28 Claims, 8 Drawing Sheets

(56) References Cited

U.S. PATENT DOCUMENTS

| | | | | |
|---|---|---|---|---|
| 8,271,959 | B2* | 9/2012 | Krauss | 717/131 |
| 8,341,236 | B1* | 12/2012 | Ganesan | 717/127 |
| 8,352,921 | B2* | 1/2013 | Jegoulev et al. | 717/131 |
| 8,589,459 | B1* | 11/2013 | Ganesan | 717/127 |
| 2003/0159070 | A1* | 8/2003 | Mayer et al. | 713/201 |
| 2005/0216793 | A1* | 9/2005 | Entin et al. | 714/38 |
| 2006/0020924 | A1* | 1/2006 | Lo et al. | 717/127 |
| 2006/0047617 | A1* | 3/2006 | Bacioiu et al. | 717/124 |
| 2006/0064554 | A1* | 3/2006 | Fridella et al. | 711/152 |
| 2006/0101402 | A1* | 5/2006 | Miller et al. | 717/124 |
| 2006/0101413 | A1* | 5/2006 | Kinno et al. | 717/127 |
| 2006/0112237 | A1* | 5/2006 | Chen et al. | 711/144 |
| 2006/0265231 | A1* | 11/2006 | Fusaro et al. | 705/1 |
| 2007/0025338 | A1* | 2/2007 | Benditovich et al. | 370/352 |
| 2007/0028219 | A1* | 2/2007 | Miller et al. | 717/124 |
| 2007/0028220 | A1* | 2/2007 | Miller et al. | 717/124 |
| 2007/0088534 | A1* | 4/2007 | MacArthur et al. | 703/17 |
| 2008/0301231 | A1* | 12/2008 | Mehta et al. | 709/204 |
| 2009/0172789 | A1* | 7/2009 | Band et al. | 726/5 |
| 2009/0292743 | A1* | 11/2009 | Bigus et al. | 707/202 |
| 2011/0289499 | A1* | 11/2011 | Haubold et al. | 717/173 |
| 2011/0296398 | A1* | 12/2011 | Vidal et al. | 717/171 |

OTHER PUBLICATIONS

Banerjee, et al., "Reciprocal Resource Sharing in P2P Environments", 2005, ACM; [retrieved on Jul. 11, 2012]; Retrieved from Internet <URL: http://dl.acm.org/citation.cfm?icl=1082603>; pp. 853-859.*

Camerer, Fehr, "Measuring social norms and preferences using experimental games: A guide for social scientists", 2003, CIT, Division of Humanities and Social Sciences; [retrieved on Jul. 11, 2012]; Retrieved from Internet <URL: http://www.hass.caltech.edu/~camerer/Camerer-Fehrjan30.pdf>; pp. 1-39.*

Kostakos, et al., "Building Common Ground for Face to Face Interactions by Sharing Mobile Device Context", 2006, Springer-Verlag Berlin Heidelberg; [retrieved on Jul. 11, 2012]; Retrieved from Internet <URL: http://www.springerlink.com/content/03g3585077w35218/fulltext.pdf>; pp. 222-238.*

Kourtellis, et al., "Prometheus: User-Controlled P2P Social Data Management for Socially-Aware Applications"; 2010 IFIP; [retrieved on Jun. 27, 2014]; Retrieved from Internet <http://dl.acm.org/citation.cfm?id=2023718>; pp. 212-231.*

Kathan, et al., "Reciprocity in Innovation Contest Communities"; 2013 ACM; [retrieved on Jun. 27, 2014]; Retrieved from Internet <http://dl.acm.org/citation.cfm?id=2492517>; pp. 1282-1290.*

Burghardt, et al., "Discovering the Scope of Privacy Needs in Collaborative Search"; 2008 IEEE; [retrieved on Jun. 27, 2014]; Retrieved from Internet <http:ieeexplore.ieee.org/stamp/stamp.jsp?tp=&arnumber=4740574>; pp. 910-913.*

Moura, et al., "The use of Reciprocal trade as a Model of Sharing Resources in P2P Networks"; 2009 IEEE; [retrieved on Jun. 27, 2014]; Retrieved from Internet <http:ieeexplore.ieee.org/stamp/stamp.jsp?tp=&arnumber=4976742>; pp. 91-96.*

* cited by examiner

| | | | |
|---|---|---|---|
| NAME | BOB | CATHY |
| EMPLOYER | XYZ LLP | ABC CORP. |
| WORK ADDRESS | 1111 PINE ST., SAN JOSE, CA 98767 | 123 MAIN ST., NEW YORK, NY 10006 |
| HOME ADDRESS | 2222 KING LN., SANTA CLARA, CA 96676 | 456 ELM ST., NEW YORK, NY 10007 |
| WORK PHONE | 408-555-1000 | 212-555-1000 |
| HOME PHONE | 408-555-2000 | 212-555-2000 |
| MOBILE PHONE | 415-555-1000 | 516-555-1000 |
| WORK EMAIL | BOBJ@XYZ.COM | CATHY@ABC.COM |
| PERSONAL EMAIL | CHSR@OP.COM | CATHYS@MAIL.ORG |
| "FOO" SOCIAL NETWORK ID | BOB1973 | CATH |
| "BAR" SOCIAL NETWORK ID | -- | -- |
| 402 | 404 | 406 |

FIG. 4

DETECTING ANOMALOUS APPLICATION ACCESS TO CONTACT INFORMATION

BACKGROUND

The use of email, instant messaging, and social networking applications has become ubiquitous. As a result, these types of applications may be pre-installed or readily downloadable for client devices. Such applications often use contact lists when operating. These contact lists typically include one or more entries, each entry containing contact information (e.g., name, address, phone number, email address, etc.) for an entity with which a user of the application may wish to communicate.

SUMMARY

In an example embodiment, a client device may install an application. The application may be, for example, one or more of a telephony application, an email application, a calendar application, a mapping application, an instant messaging application, and a social networking application. The client device may also maintain a shared set of contact information separate from the application. The client device may determine that, perhaps within a fixed time period, the application has read from the shared set of contact information, but has not written a threshold extent of data to the shared set of contact information. In response to determining that, within the fixed time period, the application has read from the shared set of contact information, but has not written a threshold extent of data to the shared set of contact information, the client device may indicate to at least one of the user interface of client device and a server device that the application is exhibiting anomalous behavior.

In another example embodiment, a server device may receive, from a client device, an indication that an application is exhibiting anomalous behavior. The application may be installed on the client device, and the anomalous behavior may involve, perhaps within a fixed time period, the application reading from a shared set of contact information, but not writing a threshold extent of data to the shared set of contact information. After receiving the indication, the server device may determine that the server device has received indications of the application behaving anomalously from a threshold number of client devices. In response to determining that the server device has received indications of the application behaving anomalously from the threshold number of client devices, the server device may transmit, to a computing device, an instruction regarding the application.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 4 illustrates an example of contact list entries, in accordance with one or more example embodiments.

DETAILED DESCRIPTION

1. Communication System and Device Architecture

The methods, devices, and systems described herein can be implemented using so-called "thin clients" client devices and "cloud-based" server devices, as well as other types of client and server devices. Under various aspects of this paradigm, client devices, such as mobile phones and tablet computers, may offload some processing and storage responsibilities to remote server devices. At least some of the time, these client services are able to communicate, via a network such as the Internet, with the server devices. As a result, applications that operate on the client devices may also have a persistent, server-based component.

The "server devices" described herein may not necessarily be associated with a client/server architecture, and therefore may be interchangeably referred to as "computing devices." Similarly, the "client devices" described herein also may not necessarily be associated with a client/server architecture, and therefore may be interchangeably referred to as "user devices."

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

A. Communication System

Figure 1:
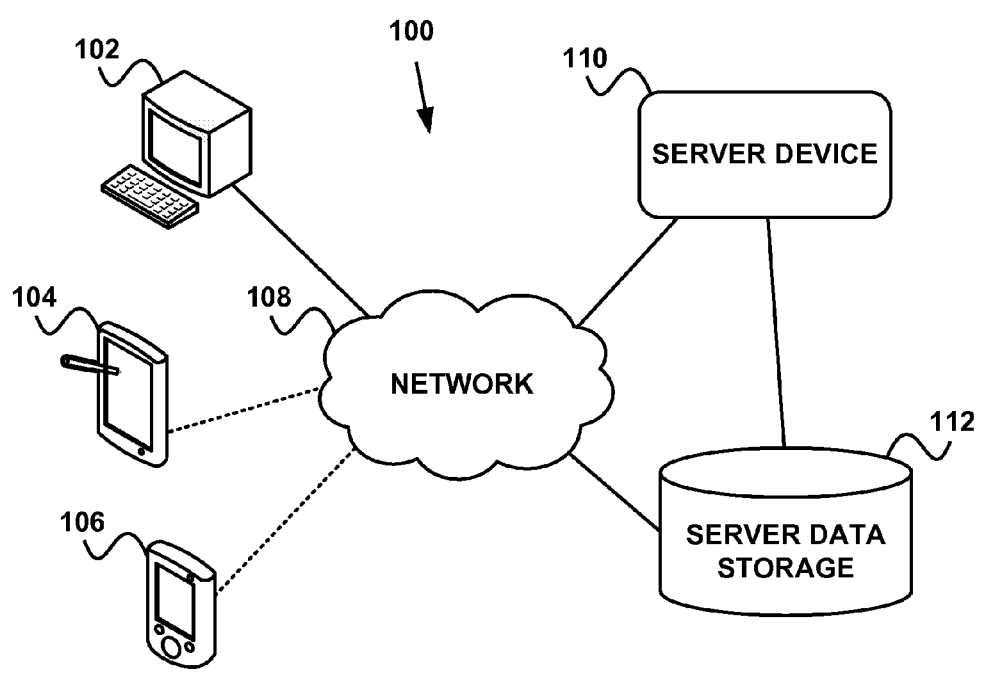
FIG. 1 is a simplified block diagram of a system, in accordance with one or more example embodiments.

FIG. 1 is a simplified block diagram of a communication system 100, in which various embodiments described herein can be employed. Communication system 100 includes client devices 102, 104, and 106, which represent a desktop personal computer (PC), a tablet computer, and a mobile phone, respectively. Each of these client devices may be able to communicate with other devices via a network 108 through the use of wireline connections (designated by solid lines) and/or wireless connections (designated by dashed lines).

Network 108 may be, for example, the Internet, or some form of public or private Internet Protocol (IP) network. Thus, client devices 102, 104, and 106 may communicate using packet-switching technologies. Nonetheless, network 108 may also incorporate at least some circuit-switching technologies, and client devices 102, 104, and 106 may communicate via circuit switching alternatively or in addition to packet switching.

A server device 110 may also communicate via network 108. Particularly, server device 110 may communicate with client devices 102, 104, and 106 according to one or more network protocols and/or application-level protocols to facilitate the use of network-based or cloud-based computing on these client devices. Server device 110 may include integrated data storage (e.g., memory, disk drives, etc.) and may also be able to access a separate server data storage 112. Communication between server device 110 and server data storage 112 may be direct, via network 108, or both direct and via network 108 as illustrated in FIG. 1. Server data storage 112 may store application data that is used to facilitate the operations of applications performed by client devices 102, 104, and 106 and server device 110.

Although only three client devices, one server device, and one server data storage are shown in FIG. 1, communication system 100 may include any number of each of these components. For instance, communication system 100 may comprise millions of client devices, thousands of server devices and/or thousands of server data storages. Furthermore, client devices may take on forms other than those in FIG. 1.

B. Server Device

Figure 2A:
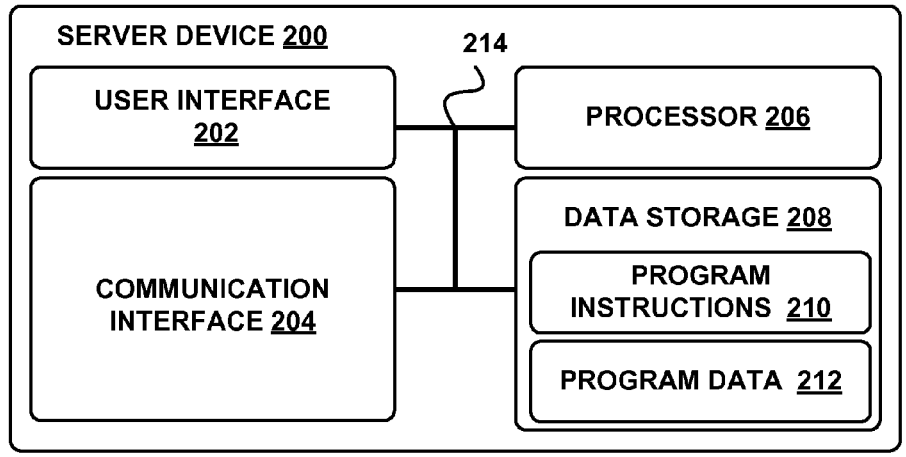
FIG. 2A is a simplified block diagram of a server device, in accordance with one or more example embodiments.

FIG. 2A is a block diagram of a server device in accordance with an example embodiment. In particular, server device 200 shown in FIG. 2A can be configured to perform one or more functions of server device 110 and/or server data storage 112. Server device 200 may include a user interface 202, a communication interface 204, processor 206, and data storage 208, all of which may be linked together via a system bus, network, or other connection mechanism 214.

User interface 202 may comprise user input devices such as a keyboard, a keypad, a touch screen, a computer mouse, a track ball, a joystick, and/or other similar devices, now known or later developed. User interface 202 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 202 may be configured to generate audible output(s), via a speaker, speaker jack, audio output port, audio output device, earphones, and/or other similar devices, now known or later developed. In some embodiments, user interface 202 may include software, circuitry, or another form of logic that can transmit data to and/or receive data from external user input/output devices.

Communication interface 204 may include one or more wireless interfaces and/or wireline interfaces that are configurable to communicate via a network, such as network 108 shown in FIG. 1. The wireless interfaces, if present, may include one or more wireless transceivers, such as a BLUETOOTH® transceiver, a Wifi transceiver perhaps operating in accordance with an IEEE 802.11 standard (e.g., 802.11a, 802.11b, 802.11g), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

In some embodiments, communication interface 204 may be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, the data encryption standard (DES), the advanced encryption standard (AES), the Rivest, Shamir, and Adleman (RSA) algorithm, the Diffie-Hellman algorithm, and/or the Digital Signature Algorithm (DSA). Other cryptographic protocols and/or algorithms may be used instead of or in addition to those listed herein to secure (and then decrypt/decode) communications.

Processor 206 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 206 may be configured to execute computer-readable program instructions 210 that are contained in data storage 208, and/or other instructions, to carry out various functions described herein.

Data storage 208 may include one or more non-transitory computer-readable storage media that can be read or accessed by processor 206. The one or more computer-readable storage media may include volatile and/or non-volatile storage components, such as optical, magnetic, organic or other memory or disc storage, which can be integrated in whole or in part with processor 206. In some embodiments, data storage 208 may be implemented using a single physical device (e.g., one optical, magnetic, organic or other memory or disc storage unit), while in other embodiments, data storage 208 may be implemented using two or more physical devices.

Data storage 208 may also include program data 212 that can be used by processor 206 to carry out functions described herein. In some embodiments, data storage 208 may include, or have access to, additional data storage components or devices (e.g., cluster data storages described below).

C. Server Clusters

Server device 110 and server data storage device 112 may store applications and application data at one or more places accessible via network 108. These places may be data centers containing numerous servers and storage devices. The exact physical location, connectivity, and configuration of server device 110 and server data storage device 112 may be unknown and/or unimportant to client devices. Accordingly, server device 110 and server data storage device 112 may be referred to as "cloud-based" devices that are housed at various remote locations. One possible advantage of such "could-based" computing is to offload processing and data storage from client devices, thereby simplifying the design and requirements of these client devices.

In some embodiments, server device 110 and server data storage device 112 may be a single computing device residing in a single data center. In other embodiments, server device 110 and server data storage device 112 may include multiple computing devices in a data center, or even multiple computing devices in multiple data centers, where the data centers are located in diverse geographic locations. For example, FIG. 1 depicts each of server device 110 and server data storage device 112 potentially residing in a different physical location.

Figure 2B:
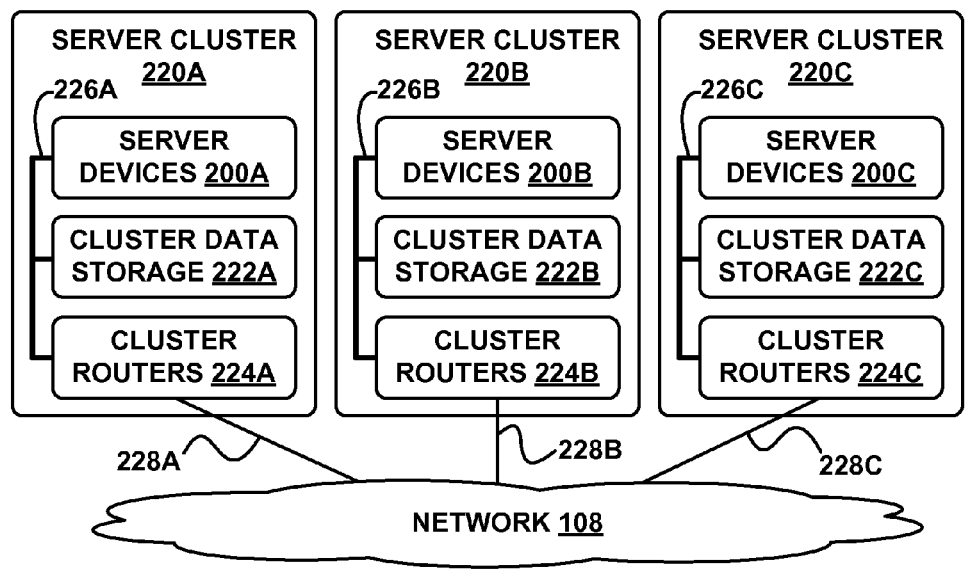
FIG. 2B is a simplified block diagram of server clusters, in accordance with one or more example embodiments.

FIG. 2B depicts a cloud-based server cluster in accordance with an example embodiment. In FIG. 2B, functions of server device 110 and server data storage device 112 may be distributed among three server clusters 220a220A, 220b220B, and 220c220C. Server cluster 220a 220A may include one or more server devices 200a200A, cluster data storage 222a222A, and cluster routers 224a 224A connected by a local cluster network 226a226A. Similarly, server cluster 220*b* 220B may include one or more server devices 200*b*200B, cluster data storage 222*b*222B, and cluster routers 224*b* 224B connected by a local cluster network 226*b*226B. Likewise, server cluster 220*c* 220C may include one or more server devices 200*c*200C, cluster data storage 222*c*222C, and cluster routers 224*c* 224C connected by a local cluster network 226*c*226C. Server clusters 220*a*220A, 220*b*220B, and 220*c* 220C may communicate with network 108 via communication links 228*a*228A, 228*b*228B, and 228*c*228C, respectively.

In some embodiments, each of the server clusters 220*a*220A, 220*b*220B, and 220*c* 220C may have an equal number of server devices, an equal number of cluster data storages, and an equal number of cluster routers. In other embodiments, however, some or all of the server clusters 220*a*220A, 220*b*220B, and 220*c* 220C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 220*a*220A, for example, server devices 200*a* 200A can be configured to perform various computing tasks of server device 110. In one embodiment, these computing tasks can be distributed among one or more of server devices 200*a*200A. Server devices 200*b* 200B and 200*c* 200C in server clusters 220*b* 220B and 220*c* 220C may be configured the same or similarly to server devices 200*a* 200A in server cluster 220*a*220A. On the other hand, in some embodiments, server devices 200*a*200A, 200*b*200B, and 200*c* 200C each may be configured to perform different functions. For example, server devices 200*a* 200A may be configured to perform one or more functions of server device 110, and server devices 200*b* 200B and server device 200*c* 200C may be configured to perform functions of one or more other server devices. Similarly, the functions of server data storage device 112 can be dedicated to a single server cluster, or spread across multiple server clusters.

Cluster data storages 222*a*222A, 222*b*222B, and 222*c* 222C of the server clusters 220*a*220A, 220*b*220B, and 220*c*220C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 110 and server data storage device 112 can be distributed across server clusters 220*a*220A, 220*b*220B, and 220*c*220C, various active portions and/or backup/redundant portions of these components can be distributed across cluster data storages 222*a*222A, 222*b*222B, and 222*c*222C. For example, some cluster data storages 222*a*222A, 222*b*222B, and 222*c* 222C may be configured to store backup versions of data stored in other cluster data storages 222*a*222A, 222*b*222B, and 222*c*222C.

Cluster routers 224*a*224A, 224*b*224B, and 224*c* 224C in server clusters 220*a*220A, 220*b*220B, and 220*c*220C, respectively, may include networking equipment configured to provide internal and external communications for the server clusters. For example, cluster routers 224*a* 224A in server cluster 220*a* 220A may include one or more packet-switching and/or routing devices configured to provide (i) network communications between server devices 200*a* 200A and cluster data storage 222*a* 222A via cluster network 226*a*226A, and/or (ii) network communications between the server cluster 220*a* 220A and other devices via communication link 228*a* 228A to network 108. Cluster routers 224*b* 224B and 224*c* 224C may include network equipment similar to cluster routers 224*a*224A, and cluster routers 224*b* 224B and 224*c* 224C may perform networking functions for server clusters 220*b* 220B and 220*c* 220C that cluster routers 224*a* 224A perform for server cluster 220*a*220A.

Additionally, the configuration of cluster routers 224*a*224A, 224*b*224B, and 224*c* 224C can be based at least in part on the data communication requirements of the server devices and cluster storage arrays, the data communications capabilities of the network equipment in the cluster routers 224*a*224A, 224*b*224B, and 224*c*224C, the latency and throughput of the local cluster networks 226*a*226A, 226*b*226B, 226*c*226C, the latency, throughput, and cost of the wide area network connections 228*a*228A, 228*b*228B, and 228*c*228C, and/or other factors that may contribute to the cost, speed, fault-tolerance, resiliency, efficiency and/or other design goals of the system architecture.

D. Client Device

Figure 3:
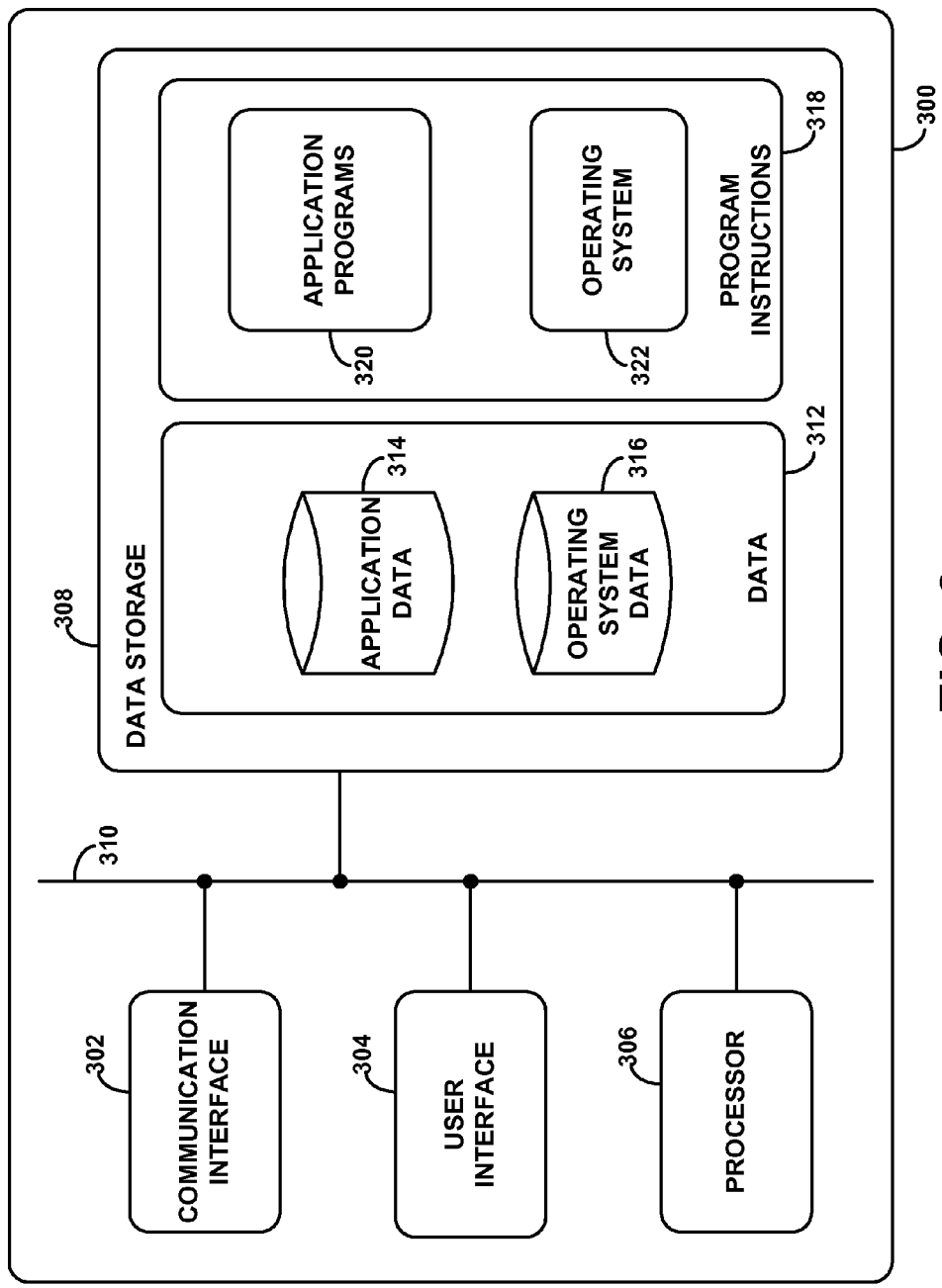
FIG. 3 is a simplified block diagram of a client device, in accordance with one or more example embodiments.

FIG. 3 is a simplified block diagram showing some of the components of an example client device 300. By way of example and without limitation, client device 300 may be a "plain old telephone system" (POTS) telephone, a cellular mobile telephone, a fax machine, an answering machine, a computer (such as a desktop, notebook, or tablet computer), a personal digital assistant (PDA), a digital video recorder (DVR), a digital TV, a remote control, or some other type of device equipped with one or more wireless or wired communication interfaces.

As shown in FIG. 3, client device 300 may include a communication interface 302, a user interface 304, a processor 306, and data storage 308, all of which may be communicatively linked together by a system bus, network, or other connection mechanism 310.

Communication interface 302 functions to allow client device 300 to communicate, using analog or digital modulation, with other devices, access networks, and/or transport networks. Thus, communication interface 302 may facilitate circuit-switched and/or packet-switched communication, such as POTS communication and/or IP or other packetized communication. For instance, communication interface 302 may include a chipset and antenna arranged for wireless communication with a radio access network or an access point. Also, communication interface 302 may take the form of a wireline interface, such as an Ethernet, Token Ring, or USB port. Communication interface 302 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 302. Furthermore, communication interface 302 may comprise multiple physical communication interfaces (e.g., a Wifi interface, a BLUETOOTH® interface, and a wide-area wireless interface).

User interface 304 may function to allow client device 300 to interact with a human or non-human user, such as to receive input from a user and to provide output to the user. Thus, user interface 304 may include input components such as a keypad, keyboard, touch-sensitive or presence-sensitive panel, computer mouse, trackball, joystick, microphone, still camera and/or video camera. User interface 304 may also include one or more output components such as a display screen (which, for example, may be combined with a touch-sensitive panel), CRT, LCD, LED, a display using DLP technology, printer, light bulb, and/or other similar devices, now known or later developed. User interface 304 may also be configured to generate audible output(s), via a speaker, speaker jack, audio output port, audio output device, earphones, and/or other similar devices, now known or later developed. In some embodiments, user interface 304 may include software, circuitry, or another form of logic that can transmit data to and/or receive data from external user input/output devices. Additionally or alternatively, client device 300 may support remote access from another device, via communication interface 302 or via another physical interface (not shown).

Processor 306 may comprise one or more general purpose processors (e.g., microprocessors) and/or one or more special purpose processors (e.g., DSPs, GPUs, FPUs, network processors, or ASICs). Data storage 308 may include one or more volatile and/or non-volatile storage components, such as magnetic, optical, flash, or organic storage, and may be integrated in whole or in part with processor 306. Data storage 308 may include removable and/or non-removable components.

Generally speaking, processor 306 may be capable of executing program instructions 318 (e.g., compiled or non-compiled program logic and/or machine code) stored in data storage 308 to carry out the various functions described herein. Therefore, data storage 308 may include a non-transitory computer-readable medium, having stored thereon program instructions that, if executed by client device 300, cause client device 300 to carry out any of the methods, processes, or functions disclosed in this specification and/or the accompanying drawings. The execution of program instructions 318 by processor 306 may result in processor 306 using data 312.

By way of example, program instructions 318 may include an operating system 322 (e.g., an operating system kernel, device driver(s), and/or other modules) and one or more application programs 320 (e.g., address book, email, web browsing, social networking, and/or gaming applications) installed on client device 300. Similarly, data 312 may include operating system data 316 and application data 314. Operating system data 316 may be accessible primarily to operating system 322, and application data 314 may be accessible primarily to one or more of application programs 320. Application data 314 may be arranged in a file system that is visible to or hidden from a user of client device 300.

Application programs 320 may communicate with operating system 312 through one or more application programming interfaces (APIs). These APIs may facilitate, for instance, application programs 320 reading and/or writing application data 314, transmitting or receiving information via communication interface 302, receiving or displaying information on user interface 304, and so on.

In some vernaculars, application programs 320 may be referred to as "apps" for short. Additionally, application programs 320 may be downloadable to client device 300 through one or more online application stores or application markets. However, application programs can also be installed on client device 300 in other ways, such as via a web browser or through a physical interface (e.g., a USB port) on client device 300.

2. Contact Lists

A contact list typically includes one or more entries, each entry containing information about an entity (e.g., a person, organization, or service). This information may comprise one or more online or physical world identities or identifiers of the respective entity.

Traditionally, contact list entries were phone numbers. Consequently, the contact lists were a form of personal phone book. Today, contact lists can be used for more than just telephony applications. Contact list entries can store multiple phone numbers, email addresses, physical addresses, instant messaging identities, social networking identities, and other information related to an entity. Thus, for example, telephony, email, calendar, mapping, instant messaging, and social networking applications can make use of the information in contact lists. As a result, many users regard the ability of their client devices to maintain contact lists as a desirable feature.

Contact lists can be populated in a number of ways. Some client devices, such as cell phones, allow users to enter the credentials for their accounts with various online services (e.g., email, instant messaging, and social networking services). Then, the client device may remotely access these accounts, perhaps via a wireless or wireline network, to download the contact information stored in each account. This contact information from the accounts may be merged into a shared contact list which may be stored on the client device. This shared contact list can be accessed by various types of applications, such as telephony, email, mapping, instant messaging, and social networking applications. Additionally, a user may be able to manually edit the shared contact list to add, remove, or change entries. Thus, a shared contact list may be "shared" because multiple applications can write to it, and/or because multiple applications can read from it.

For purposes of illustration, FIG. 4 depicts an example contact list 400 for a hypothetical person, Alice. Contact list 400 may be a shared contact list that is stored on Alice's client device. As shown, contact list 400 contains an index of fields 402, and example entries for Bob (entry 404) and Cathy (entry 406), both of whom are contacts of Alice. Each of these entries contains various types of contact information, though not all fields in each entry needs to be populated. In some embodiments, a contact list may be sparsely populated, in that fewer than half of the entries are populated. For sake of convenience, contact list 400 is presented as a table in FIG. 4. Nonetheless, a contact list can be presented in other ways as well.

Each entry 404 and 406 of contact list 400 includes the respective contact's name, employer, work address, home address, work phone number, home phone number, and mobile phone number. Additionally, contact list 400 includes identities on the "Foo" social network for both Bob and Cathy. This indicates that Alice is linked with both Bob and Cathy on the "Foo" social network. However, contact list 400 does not include identities on the "Bar" social network for either Bob or Cathy. This indicates that Alice is not linked with Bob or Cathy on the "Bar" social network. Bob and/or Cathy might not have accounts on the "Bar" social network, or might have accounts on the "Bar" social network but not be linked to Alice via these accounts.

In full generality, contact list 400 may contain other types of information. For example, index of fields 402 may include fields for instant messaging identities, video conferencing identities, custom fields, and so on. Further, contact list 400 may be represented in various ways, such as by one or more lists, trees, arrays, hash tables, databases, files, and so on.

A. Third Party Use

Contact lists may contain valuable marketing intelligence. For example, if Alice has information about Bob and Cathy in the contact list on Alice's client device, a reasonable conclusion is that Bob and Cathy have at least some interests or characteristics in common with Alice. For instance, they may be friends, relatives, neighbors, coworkers, members of the same club, or have some other relationship. Therefore, an organization that is doing business with Alice might be interested in soliciting business from Bob and Cathy as well, due to their relationship with Alice.

As a result, some organizations may attempt to collect the information from a contact list, and then use this information to solicit one or more individuals. For instance, an organization that has collected information from Alice's shared contact list may solicit business from Bob and Cathy. Alternatively, the organization that collects information from a contact list may sell some or all of the information therein to other organizations that may be interested in conducting such solicitation.

For example, contact lists are potentially valuable to operators of social networks. Competition amongst these operators can be intense, and the success of a social network is often correlated with the sheer number of users that have accounts with the social network. A shared contact list stored on a client device may contain information about social networks of which the user of the client device is a member. Particularly, the shared contact list may include information about entities that the user has linked to in each of these social networks. For a given user, these social networking contacts may be referred to as the given user's "social graph." Thus, a social network operator may attempt to expand its own social network by obtaining, from the given user's social graph, information about its competitor's social networks.

For example, suppose that (i) Alice is connected with Bob and Cathy via the "Foo" social network, (ii) Alice also has an account with the "Bar" social network, and (iii) Bob and Cathy do not have accounts with the "Bar" social network. Suppose further that the "Foo" social network connections between Alice and Bob and between Alice and Cathy are represented in Alice's shared contact list. If the "Bar" social network obtains this information from Alice's shared contact list, the "Bar" social network may attempt to contact Bob and/or Cathy. This attempted contact may take the form of sending emails, text messages, etc., that invite Bob and/or Cathy to join the "Bar" social network.

Given the possibility that some organizations may solicit users in this fashion, it may be desirable to inform client device users of application behavior that may facilitate such solicitation.

B. Application Markets and Warning Users of Application Behavior

On some types of client devices, applications can be acquired by downloading them from an application market. An application market may warn users, prior to downloading or installing these applications, of the types of behavior in which the application might engage. For instance, the application market may warn users of behaviors that the application has explicitly stated that it might engage in, as well as behaviors that the application has not explicitly stated that it might engage in but has been observed to engage in. This information may help a user decide whether to opt-out of using applications that might engage in behavior the user finds undesirable. However, these pre-installation warnings do not provide users with specific indications of when and how an application is behaving anomalously.

An application market may comprise one or more server devices arranged to store or otherwise have access to applications that can operate on client devices. Possibly with the assistance of software operating on the client devices, application markets may present these applications to users in various menus and/or categories, and may also allow users to perform keyword searches for applications. Some applications may be free to download, while others may be non-free and therefore associated with a per download fee. Application markets may also facilitate collecting payments for non-free applications.

The operator of an application market may be the same entity that provides some or all of the client device's hardware, operating system, and/or applications. Regardless, the operator may have a vested interest in providing a positive user experience to users of the application market. Therefore, the application market may be configured to inform users, prior to the download of an application, of the types of behavior in which the application might engage. Alternatively or additionally, the application market may instruct the client device to inform users of these types of behaviors after an application has been downloaded, but before the application has been installed on the client device.

For instance, if a user expresses an interest in downloading a given application from the application market to the user's client device, the application market and/or the client device may notify the user of how the application might utilize the client device. Thus, the user may be warned that the given application can perform one or more of the following behaviors: access the Internet, change network interface connectivity, transmit emails, read from and/or write to the user's calendar, and read from and/or write to the user's contact list, and prevent the client device from entering a low-power (battery saving) mode.

Such a warning may indicate that the application has the ability to engage in behavior that may be undesirable to some users. However, the warning may not indicate that the application actually has engaged in this behavior.

If the user indicates that he or she acquiesces to the given application potentially performing the warned-about behavior on the user's client device, the application may then be downloaded and/or installed on this client device. If the user indicates that he or she does not acquiesce, then the application might not be downloaded or installed. In this way, the user can be forewarned of the application's potentially undesirable behavior before installing the application the client device. The user may also have the choice to not install the application if the user does not want the application to conduct these behaviors on the user's client device.

C. Application Access to Shared Contact Lists

Despite pre-installation warnings from application markets, some users may grant applications permission to engage in warned-about behavior. However, these users might not appreciate the extent to which the application is behaving anomalously.

For example, information in a shared contact list can be accessed by any application that is installed on the client device and that has the requisite permission. An application may be designed to read part, or all, of a client device's shared contact list without reciprocating by sharing its own contact information. Additionally, the application might transmit the read contact information to a remote server. By not behaving in a reciprocal manner, the application uses contact information from the shared contact list but does not enhance the utility of the shared contact list.

One possible indication of when an application may be engaging in this type of behavior is if the application reads from a shared contact list on the client device, but does not write a threshold extent of data to the shared contact list. Particularly, a social networking application that reads from the shared contact list but does not write to the shared contact list (or writes relatively little to the shared contact list) might be gathering social graph information from competing social networks without contributing its own social graph information.

For example, Alice might download a social networking application for the "Bar" social network and install it on her client device. Prior to or during this download and/or installation, the Alice may have acquiescend to the "Bar" social networking application reading from and writing to the Alice's shared contact list. However, once the "Bar" social networking application is installed, it might only read from the shared contact list, but not write a threshold extent of data to the shared contact list.

Moreover, the "Bar" social networking application may read the shared contact list and transmit it to servers controlled by the "Bar" social network, but not write Alice's social graph from the "Bar" social network into the shared contact list. Thus, the "Bar" social networking application would be collecting contact information that other applications have shared without reciprocating by sharing its own contact information. Alice may find this behavior undesirable, not only because her shared contact list has been transmitted to the "Bar" social network servers, but also because the utility of Alice's shared contact list has not been enhanced by incorporation of her "Bar" social graph.

Therefore, it would be beneficial for a user's client device to be able to determine when an application reads from a shared contact list on the client device, but does not write a threshold extent of data to the shared contact list. In response to making such a determination, the client device may inform the user that the "Bar" social networking application is exhibiting anomalous behavior. For example, the client device may trigger a textual or graphical message to appear on the screen of the client device, or the sounding of an audio alert. Also in response to making such a determination, the client device may transmit an indication to a server device (e.g., a component of the application market) that the "Bar" social networking application is exhibiting anomalous behavior. Through these mechanisms, both the user of the client device and other parties may be made aware of the "Bar" social networking application's anomalous behavior. Then, these parties may take steps to further investigate the reported anomalous behavior.

Figure 5:
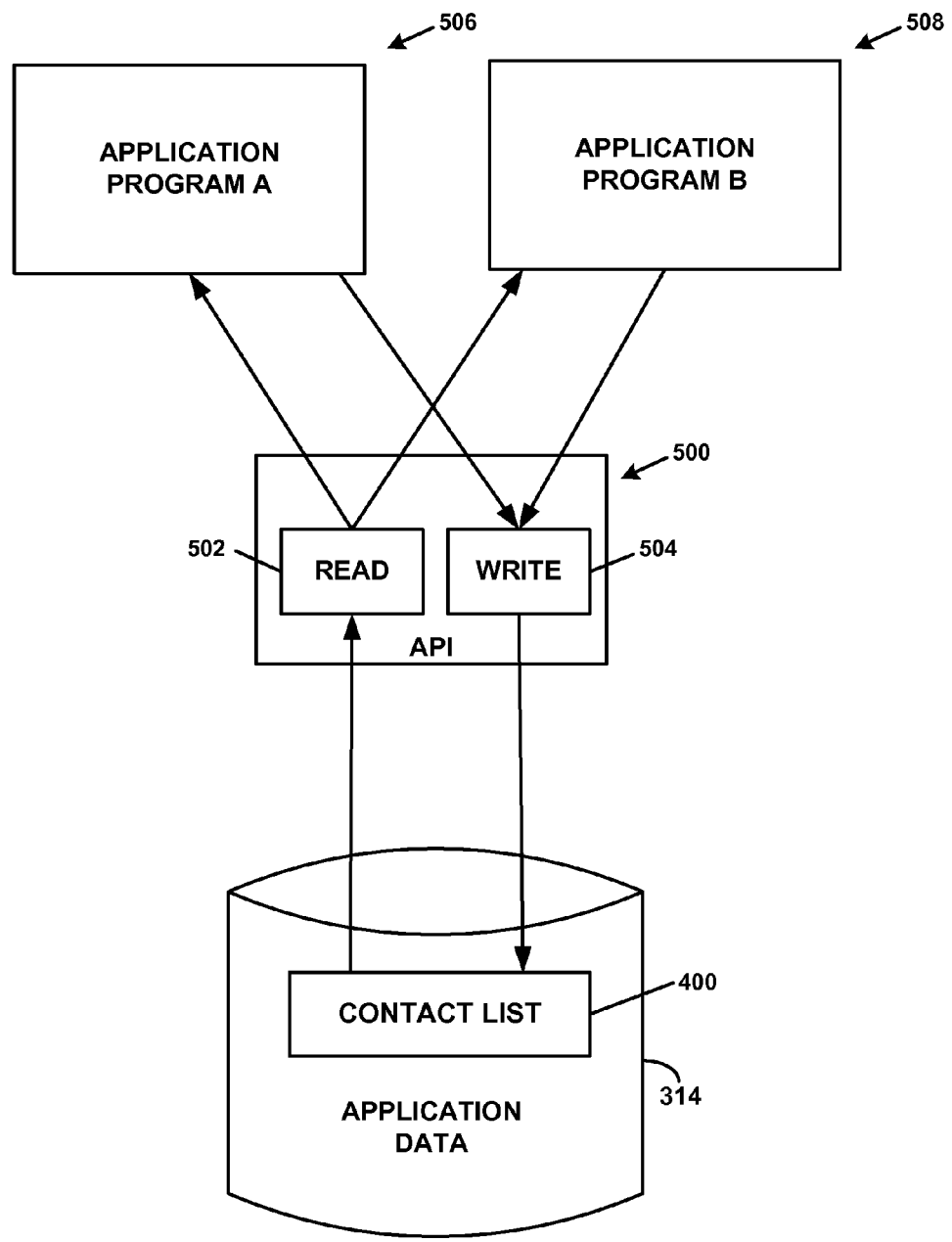
FIG. 5 depicts use of an application programming interface to access a contact list, in accordance with one or more example embodiments.

One way in which a client device can detect when an application reads from a shared contact list on the client device, but does not write a threshold extent of data to the shared contact list is to monitor the application's use of an API associated with reading information from and writing information to the client device's data storage. FIG. 5 illustrates how applications might be arranged to use an API to access a shared contact list that is stored on a client device.

In FIG. 5, application data 314 contains contact list 400. The client device may control access to contact list 400 through API 500. Generally speaking, an API specifies how two or more applications can communicate with one other. Alternatively or additionally, an API may specify how applications can communicate with an operating system. Regardless, this communication may be facilitated by, for example, function calls that allow the applications to read and write data.

API 500 includes a read function 502 and a write function 504. Read function 502 may define how application programs, such as application program A 506 and application program B 508, can read information stored in application data 314. Similarly, write function 504 may define how application programs can write information into application data 314. Thus, application program A 506 and application program B 508 may use read function 502 to read from contact list 400, and write function 504 to write to contact list 400.

The functions of API 500 may be accessed by application program A 506 and application program B 508 via a shared library, dynamic link library (DLL), static library, or some other mechanism. For example, application program A 506 and application program B 508 may each be linked to a shared library containing API 500. The linking may allow these application programs to load (and thereby access) part or all of the shared library. The loading may occur either when the application programs are initiated, or as needed during the execution of the application programs.

API 500 may be arranged to communicate with lower-level functions in the operating system (e.g., kernel) of a client device to carry out various tasks. Thus, for instance, read function 502 may communicate with a memory management module and/or device driver module of the client device operating system to read information from contact list 400, and write function 504 may communicate with the memory management module and/or device driver module to write information to contact list 400.

FIG. 5 is presented for purposes of illustration. Thus, there may be other ways in which application programs can access information in a data storage, either with or without the use of an API.

D. Detecting Anomalous Behavior

Regardless of how applications are arranged to access a shared contact list, a client device may be able to detect when applications engage in anomalous behavior with respect to this access. For example, the client device could determine that, within a fixed time period, an application has read from a shared contact list (e.g., a read API was used to access the shared contact list), but has not written the threshold extent of data to the shared contact list (e.g., a write API was not sufficiently used to access the shared contact list).

This fixed period of time could take on any value, such as 1 second, 10 seconds, 1 minute, 10 minutes, 1 hour, 24 hours, a week, a month, and so on. Thus, for example, suppose that the fixed period of time is 10 minutes, and that an application reads from the shared contact list at time t. Then, if the application (i) has not written to the shared contact list in the 10 minutes before time t and, (ii) does not write the threshold extent of data to the shared contact list by time t+10 minutes, the client device may consider the application behavior to be anomalous.

The threshold extent may be expressed as a threshold number of entries (e.g., 1, 5, 10, 50, etc.), a threshold amount of data in a single entry (e.g., 10 bytes, 50 bytes, 100 bytes, etc.), a threshold amount of data across multiple entries (e.g., 100 bytes, 500 bytes, 1000 bytes, etc.) or in other ways. In some embodiments, writing a threshold extent of data to the shared contact list may be expressed as an extent of change made to the shared contact list by the writing.

In an alternative embodiment, a client device may classify application behavior to be anomalous if the application reads at least x entries from the shared contact list, but writes less than y entries to the shared contact list, where $x>0$, $y>0$, and $x \geq y$. In another alternative embodiment, the client device may consider application behavior to be anomalous if the application reads at least x % of the entries from the shared contact list, but writes to less than y % of the entries to the shared contact list, where $x>0$, $y>0$, and $x \geq y$. Additional embodiments may exist, and the examples given above are not intended to be exclusive nor limiting.

In another alternate embodiment, an API (or the client device) may require that, prior to using the API, an application declare its intended use of the API as either reciprocal or non-reciprocal. A declaration of reciprocal intended use indicates that the application will both read from and write to the API (e.g., the application will share the application's contact information). A declaration of non-reciprocal intended use indicates that the application will only read from the API (e.g., the application will not share the application's contact information, or the application has no information to share).

In this embodiment, if an application declares non-reciprocal intended use, the client device may warn the user of this non-reciprocal intended use, and/or the consequences thereof, and seek the user's permission before allowing the application to use the API. Additionally, if an application fails to make a declaration, the client device may, as a default, treat the application as if it has made a declaration of non-reciprocal intended use.

For an application that has declared reciprocal intended use but uses the API in a non-reciprocal fashion, the client device may classify the application's behavior as anomalous. Thus, for example, if the client device determines that, within a fixed time period, the application has read from a shared contact list (e.g., a read API was used to access the shared contact list), but has not written the threshold extent of data to the shared contact list (e.g., a write API was not sufficiently used to access the shared contact list), the client device may notify the user and/or a remote server that the application is behaving anomalously.

3. Example Operations

As noted above, anomalous application behavior detected on any one client device may or may not be indicative that the application is behaving in an undesirable fashion. Therefore, a potentially large number of client devices may be arranged to detect an application's anomalous behavior, and then transmit indications of this behavior to a server device. If the server device receives a sufficient number of these indications, the server device may conclude that the application's behavior merits further investigation.

Figure 6:
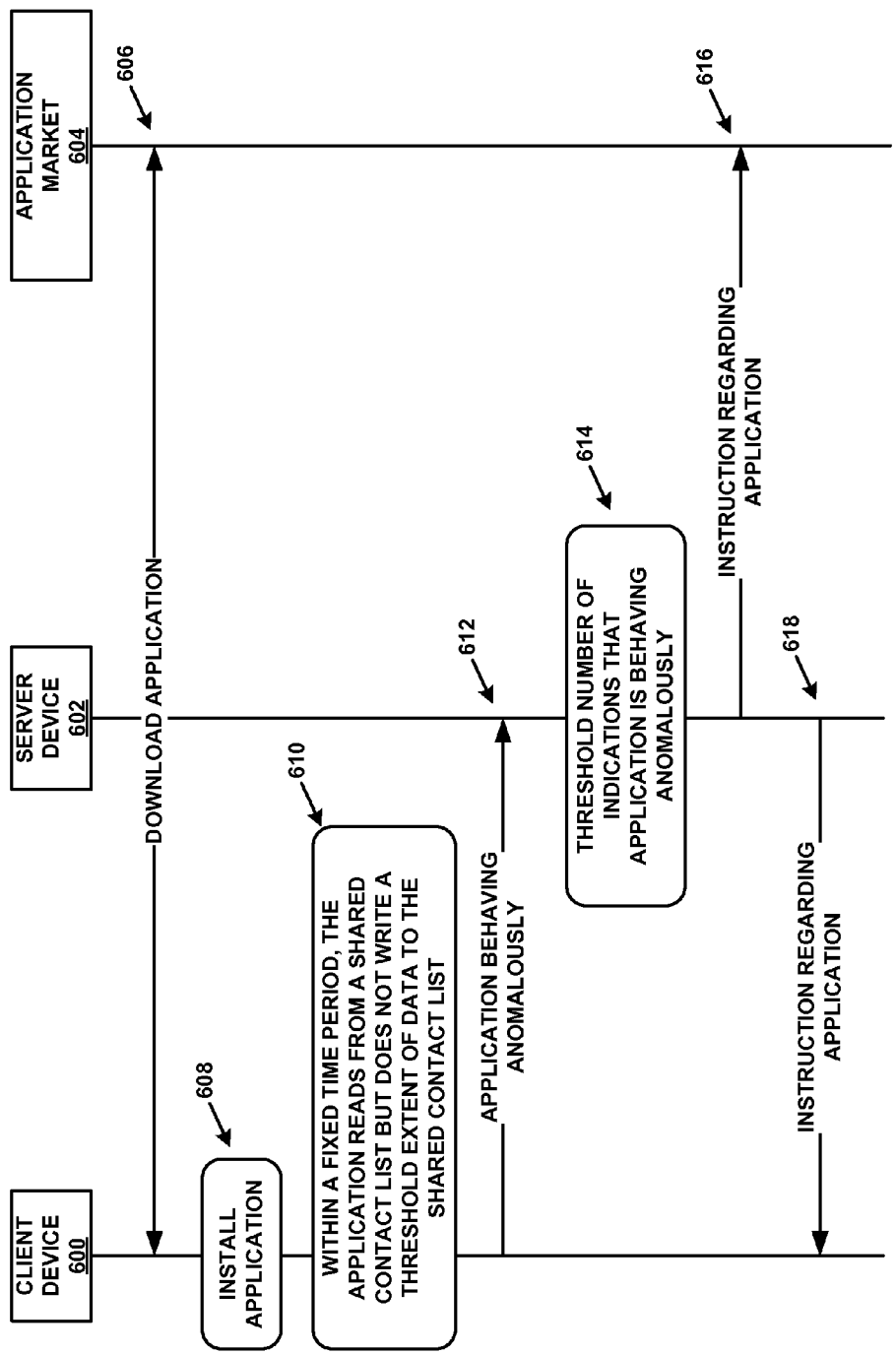
FIG. 6 is a message flow, in accordance with one or more example embodiments.

FIG. 6 is a message flow that illustrates an example embodiment. In FIG. 6, a client device 600 communicates with a server device 602 and an application market 604. Server device 602 and application market 604 may also communicate with one another, and, in some embodiments, may be the same physical device or in the same server cluster. Client device 600 may be any form of computing device, such as a mobile phone, tablet computer, or desktop computer, and may contain a shared contact list.

At step 606, client device 600 communicates with application market 604 to download an application. As part of this communication, the user of client device 600 may be informed that the application can read from and/or read to the shared contact list on client device 600. Nonetheless, at step 608, client device 600 may install the application, perhaps at the request of the user. At step 610, client device 600 may determine that, perhaps within a fixed time period, the application has read from the shared contact list, but has not written a threshold extent of data to the shared contact list. At step 612, possibly in response to making this determination, client device 600 may transmit an indication to server device 602 that the application is behaving anomalously. This indication may include some combination of the name of the application, the anomalous behavior in which the application engaged, and when the application engaged in this behavior.

At step 614, which may take place in response to receiving the indication from client device 600, server device 602 may determine that it has received a threshold number of indications that the application is behaving anomalously. This threshold number may be as little as one indication or some greater number of indications (e.g., 10, 100, 1000, etc.). Alternatively, this threshold may be a number of unique client devices from which the server device received an indication that the application is behaving anomalously. In some embodiments, the threshold number may be expressed as a percentage of client devices that have downloaded the application (e.g., a threshold of 10% would be met if 100 client devices have downloaded an application and at least 10 of these client devices have indicated that the application is behaving anomalously).

At steps 616 and 618, perhaps in response to making the determination at step 614, server 602 may transmit instruction(s) regarding the application to application market 604 and/or client device 600, respectively. Server device 602 may transmit the same instruction or different instructions to application market 604 and client device 600.

An instruction that server device 602 transmits to application market 604 may indicate, for example, that application market 604 should remove the application, thereby preventing other client devices from downloading the application. Alternatively or additionally, the instruction may indicate that application market 604 should flag the application, so that the operator of application market 604 can investigate the behavior in more detail.

Similarly, an instruction that server device 602 transmits to client device 600 may indicate, for example, that client device 600 should remove the application. Alternatively or additionally, the instruction may indicate that client device 600 should notify the user of client device 600 of the application's behavior. This notification may take the form of an audio signal, an indication appearing on a screen of client device 600, and/or some other indication on or from the user-interface of client device 600.

Moreover, this notification may be different from the pre-installation warning described in Section 2B. For example, this notification may inform the user of client device 600 that the application has been known to read from shared contact lists without contributing to these shared contact lists in a reciprocal fashion. In contrast, the pre-installation warning may only inform the user that the application is capable of accessing shared contact lists.

Figure 7:
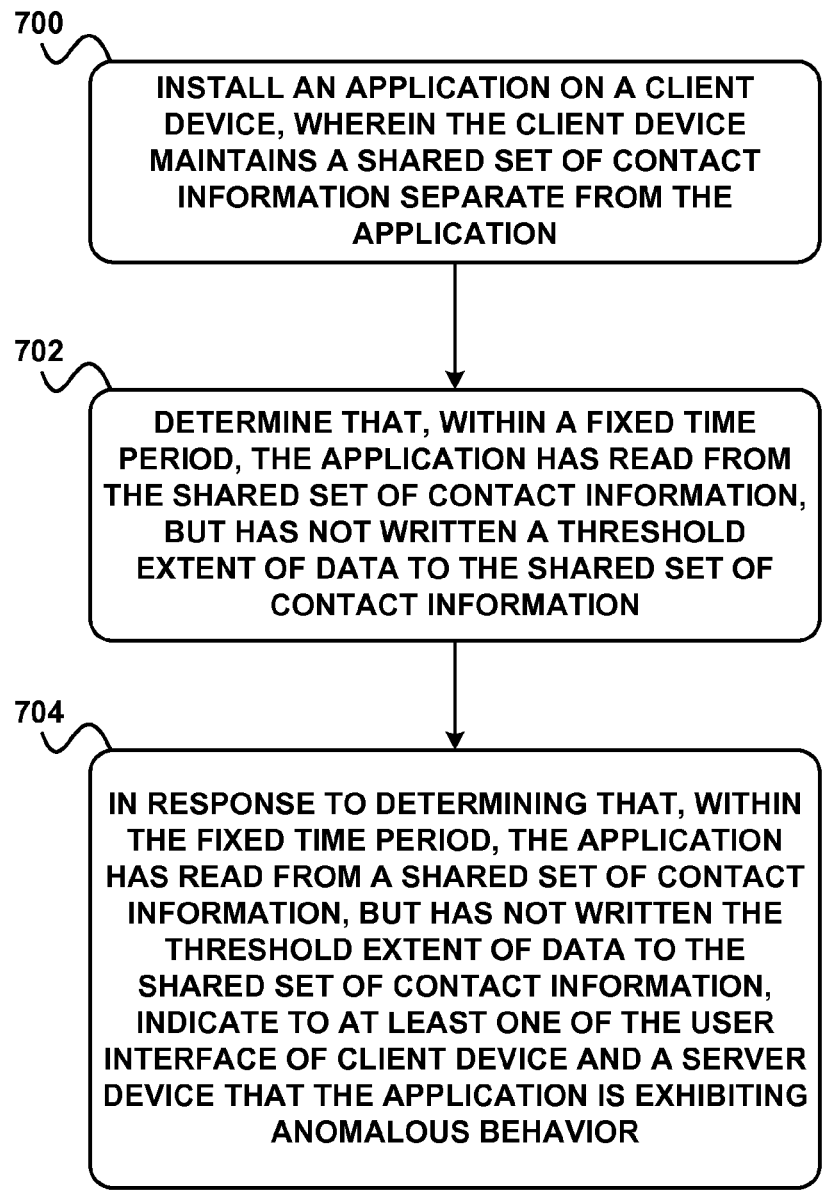
FIG. 7 is a flow chart, in accordance with one or more example embodiments.

FIG. 7 is a flow chart of another example embodiment, further illustrating client device operation. At step 700, a client device may install an application. The application may be, for example, one or more of a telephony application, an email application, a calendar application, a mapping application, an instant messaging application, and a social networking application. The client device may also maintain a shared set of contact information separate from the application.

At step 702, the client device may determine that, perhaps within a fixed time period, the application has read from the shared set of contact information, but has not written a threshold extent of data to the shared set of contact information. At step 704, possibly in response to determining that, within the fixed time period, the application has read from the shared set of contact information, but has not written a threshold extent of data to the shared set of contact information, the client device may indicate to at least one of the user interface of client device and a server device that the application is exhibiting anomalous behavior. Any indication made to the server device, may involve the client device transmitting the indication to the server device over a network.

Further, the client device referred to in FIG. 7 may also install a second application. The client device may determine that, within the fixed time period, the second application has read from the shared set of contact information, and has also written a threshold extent of data to the shared set of contact information. Perhaps in response to determining that, within the fixed time period, the second application has read from the shared set of contact information, and has also written a threshold extent of data to the shared set of contact information, the client device may indicate to at least one of the user interface of the client device and the server device that the second application is exhibiting non-anomalous behavior.

Regardless, the process of determining that, within the fixed time period, the application has read from the shared set of contact information, but has not written a threshold extent of data to the shared set of contact information may further comprise the client device (i) detecting that the application has used a read function of a contact list API to receive at least part of the shared set of contact information, and (ii) detecting that the application has not made sufficient use of a write function of the contact list API to write the threshold extent of data to the shared set of contact information.

The application referred to in FIG. 7 may have access to an application-specific set of contact information that is separate from the shared set of contact information. In this case, the client device determining that, within the fixed time period, the application has read from the shared set of contact information, but has not written a threshold extent of data to the shared set of contact information may further comprise the application (i) incorporating at least some entries from the shared set of contact information into the application-specific set of contact information, and (ii) not incorporating a threshold extent of entries from the application-specific set of contact information into the shared set of contact information.

Additionally, if the indication is made to the server device, the client device may also receive, from the server device, an instruction to disable the application. The instruction may be sent as a result of the client device transmitting the indication to the server device. Perhaps in response to receiving the instruction, the client device may disable the application. Alternatively, the client device may receive, from the server device, an instruction to uninstall the application. The instruction may be sent as a result of the client device making the indication to the server device. In response to receiving the instruction, the client device may uninstall the application.

It should be understood that disabling an application may place the application and/or the client device in a state in which the application cannot or will not execute. However, uninstalling an application may refer to the act of removing the application from the client device. The client device may be arranged to only allow either of these operations upon explicit approval of the user.

Figure 8:
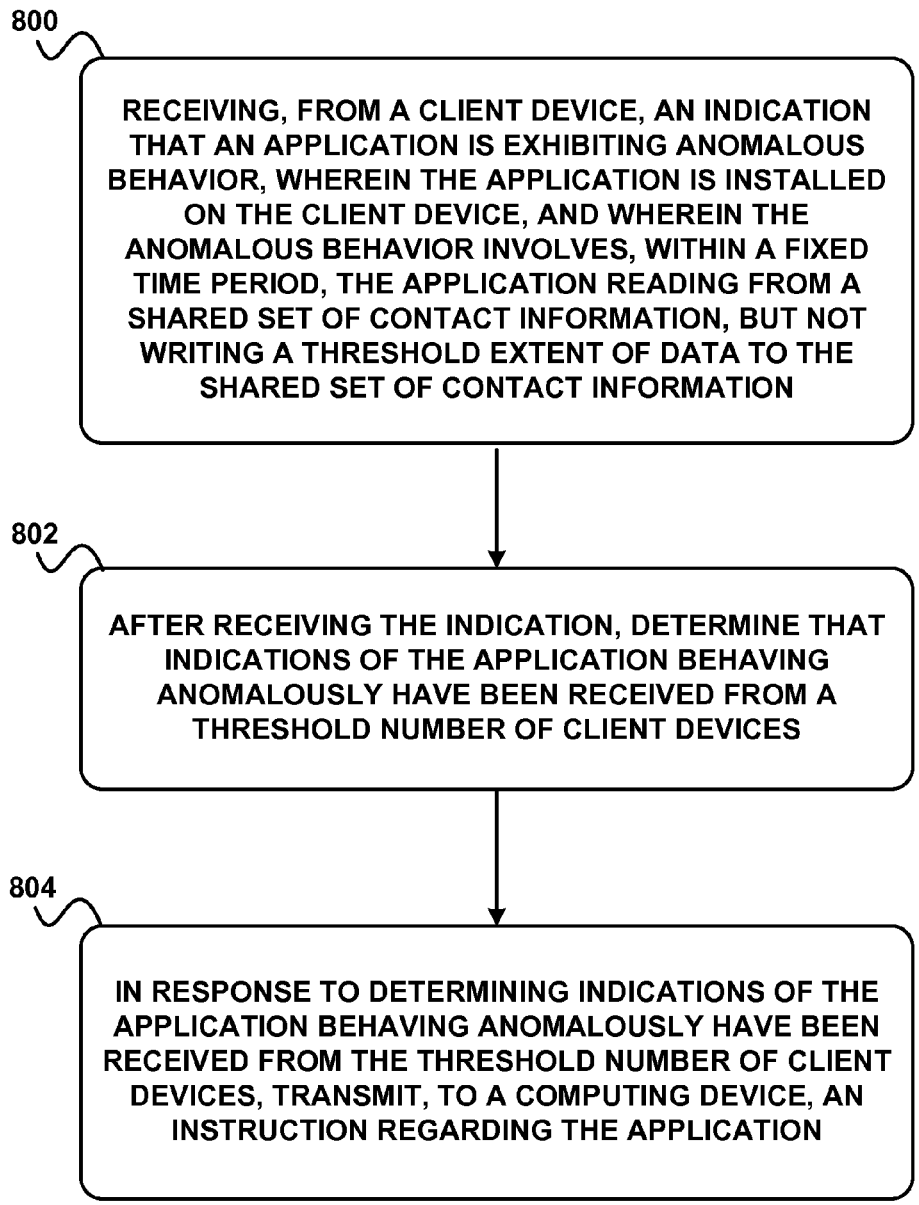
FIG. 8 is another flow chart, in accordance with one or more example embodiments.

FIG. 8 is a flow chart of another example embodiment, illustrating server device operation. At step 800, a server device may receive, from a client device, an indication that an application is exhibiting anomalous behavior. The application may be installed on the client device, and the anomalous behavior may involve, within a fixed time period, the application reading from a shared set of contact information, but not writing a threshold extent of data to the shared set of contact information. At step 802, after receiving the indication, the server device may determine that the server device has received indications of the application behaving anomalously from a threshold number of client devices. At step 804, in response to determining that the server device has received indications of the application behaving anomalously from the threshold number of client devices, the server device may transmit, to a computing device, an instruction regarding the application.

In some cases, the computing device may be the client device, and the instruction may instruct the client device to disable the application. Alternatively, the instruction may instruct the client device to uninstall the application.

In other cases, the computing device may be an application server device. The application server device may comprise an application market that allows client devices to download applications from the application server device. The instruction may instruct the application market to disable downloads of the application. Alternatively, instruction may instruct the application market to warn each client device attempting to download the application that the application has been known to exhibit anomalous behavior on at least some client devices.

With respect to any or all of the message flows and flow charts in the figures and as discussed herein, each step or block may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or message may be executed out of order from that shown or discussed, including substantially concurrent or in reverse order, depending on the functionality involved. Further, more or fewer steps, blocks and/or functions may be used with any of message flows and flow charts discussed herein, and these message flows and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data), and the program code may include one or more instructions executable by a processor for implementing specific logical functions or actions in the method or technique. The program code and/or related data may be stored on any type of computer-readable medium such as a storage device including a disk or hard drive or other storage medium.

Moreover, a step or block that represents one or more information transmissions may correspond to information transmissions between software and/or hardware modules in the same physical device. However, other information transmissions may be between software modules and/or hardware modules in different physical devices.

4. Conclusion

While various aspects and embodiments have been disclosed herein, other aspects and embodiments will be apparent to those skilled in the art. For example, example embodiments may operate on data other than a contact list, such as, but not limited to, user documents, user settings, and client device settings. Particularly, the embodiments herein may also be used to detect an application's anomalous access behavior with respect to any data to which the application has not been granted access permission. Thus, the various aspects and embodiments disclosed herein are for purposes of illustration and are not intended to be limiting, with the true scope and spirit being indicated by the claims.

We claim:

1. A computer-implemented method comprising:
  installing, by a client device, an application, wherein the client device maintains contact information stored on the client device and separate from the application, and wherein the contact information stored on the client device is accessible to at least some applications operable on the client device;
  detecting that the application has declared a reciprocal intended use of the contact information, wherein the application indicates that the application will use a read function of a contact list application programming interface and use a write function of the contact list application programming interface;

determining, by the client device, that, within a predetermined fixed time period, (i) the application has used the read function of the contact list application programming interface to read at least part of the contact information, and (ii) the application has not used the write function of the contact list application programming interface to write a threshold extent of data to the contact information; and in response to (i) the application having declared the reciprocal intended use of the contact information, and (ii) determining that, within the predetermined fixed time period, the application has used the read function of the contact list application programming interface to read at least part of the contact information, and the application has not used the write function of the contact list application programming interface to write the threshold extent of data to the contact information, indicating, by the client device, to at least one of a user interface of the client device and a server device that the application is exhibiting anomalous behavior.

2. The computer-implemented method of claim 1, further comprising:

installing, by the client device, a second application;

determining, by the client device, that the second application has read from the contact information stored on the client device, and has also written the threshold extent of data to the contact information stored on the client device; and in response to determining that the second application has read from the contact information stored on the client device, and has also written the threshold extent of data to the contact information stored on the client device, indicating, by the client device, to at least one of the user interface of the client device and the server device that the second application is exhibiting non-anomalous behavior.

3. The computer-implemented method of claim 1, wherein the application has access to an application-specific set of contact information that is separate from the contact information stored on the client device, and wherein determining that, within the predetermined fixed time period, the application has read from the contact information stored on the client device, but has not written the threshold extent of data to the contact information stored on the client device further comprises:

the application incorporating at least some entries from the contact information stored on the client device into the application-specific set of contact information; and the application not incorporating a threshold extent of entries from the application-specific set of contact information into the contact information stored on the client device.

4. The computer-implemented method of claim 1, wherein the application comprises an email application.

5. The computer-implemented method of claim 1, wherein the application comprises a social networking application.

6. The computer-implemented method of claim 1, wherein the indication is made to the server device, the method further comprising:

receiving, by the client device, an instruction from the server device to disable the application, wherein the instruction is sent as a result of the client device making the indication to the server device; and in response to receiving the instruction, disabling, by the client device, the application.

7. The computer-implemented method of claim 1, wherein the indication is made to the server device, the method further comprising:

receiving, by the client device, an instruction from the server device to uninstall the application, wherein the instruction is sent as a result of the client device making the indication to the server device; and in response to receiving the instruction, uninstalling, by the client device, the application.

8. The computer-implemented method of claim 1, wherein the predetermined fixed time period is about 10 minutes or less.

9. The computer-implemented method of claim 8, wherein the predetermined fixed time period is about 1 minute or less.

10. A computer-implemented method comprising:

receiving, by a server device, an indication from a client device that an application is exhibiting anomalous behavior, wherein the application is installed on the client device, and wherein the anomalous behavior involves the application declaring a reciprocal intended use of the contact information such that the application will use a read function of a contact list application programming interface and use a write function of the contact list application programming interface, and within a predetermined fixed time period, (i) the application using the read function of the contact list application programming interface to read at least part of the contact information, and (ii) the application not using the write function of the contact list application programming interface to write a threshold extent of data to the contact information;

after receiving the indication, determining, by the server device, that the server device has received indications of the application behaving anomalously from a threshold number of at least two client devices; and in response to determining that the server device has received indications of the application behaving anomalously from the threshold number of at least two client devices, transmitting, by the server device, an instruction regarding the application to a computing device.

11. The computer-implemented method of claim 10, wherein the computing device is the client device, and wherein the instruction instructs the client device to disable the application.

12. The computer-implemented method of claim 10, wherein the computing device is the client device, and wherein the instruction instructs the client device to uninstall the application.

13. The computer-implemented method of claim 10, wherein the computing device is an application server device, wherein the application server device allows client devices to download applications from the application server device, and wherein the instruction instructs the application server device to disable downloads of the application.

14. The computer-implemented method of claim 10, wherein the computing device is an application server device, wherein the application server device allows client devices to download applications from the application server device, and wherein the instruction instructs the application server device to warn each client device attempting to download the application that the application exhibits anomalous behavior.

15. An article of manufacture including a non-transitory computer-readable medium, having stored thereon program instructions that, upon execution by a client device, cause the client device to perform operations comprising:

installing an application, wherein the client device maintains contact information stored on the client device separate from the application, and wherein the contact information stored on the client device is accessible to at least some applications operable on the client device;

detecting that the application has declared a reciprocal intended use of the contact information, wherein the application indicates that the application will use a read function of a contact list application programming interface and use a write function of the contact list application programming interface;

determining that, within a predetermined fixed time period, (i) the application has used the read function of the contact list application programming interface to read at least part of the contact information, and (ii) the application has not used the write function of the contact list application programming interface to write a threshold extent of data to the contact information; and in response to (i) the application having declared the reciprocal intended use of the contact information, and (ii) determining that, within the predetermined fixed time period, the application has used the read function of the contact list application programming interface to read at least part of the contact information, and the application has not used the write function of the contact list application programming interface to write the threshold extent of data to the contact information, indicating to at least one of a user interface of the client device and a server device that the application is exhibiting anomalous behavior.

16. The article of manufacture of claim 15, wherein the program instructions cause the client device to perform operations further comprising:

installing a second application;

determining that the second application has read from the contact information stored on the client device, and has also written the threshold extent of data to the contact information stored on the client device; and in response to determining that the second application has read from the contact information stored on the client device, and has also written the threshold extent of data to the contact information stored on the client device, indicating to at least one of the user interface of the client device and the server device that the second application is exhibiting non-anomalous behavior.

17. The article of manufacture of claim 15, wherein the application has access to an application-specific set of contact information that is separate from the contact information stored on the client device, and wherein the client device determining that, within the predetermined fixed time period, the application has read from the contact information stored on the client device, but has not written the threshold extent of data to the contact information stored on the client device further comprises:

the application incorporating at least some entries from the contact information stored on the client device into the application-specific set of contact information; and the application not incorporating a threshold extent of entries from the application-specific set of contact information into the contact information stored on the client device.

18. The article of manufacture of claim 15, wherein the application comprises an email application.

19. The article of manufacture of claim 15, wherein the application comprises a social networking application.

20. The article of manufacture of claim 15, wherein the indication is made to the server device, and wherein the program instructions cause the client device to perform operations further comprising:

receiving, from the server device, an instruction to disable the application, wherein the instruction is sent as a result of the client device making the indication to the server device; and in response to receiving the instruction, disabling the application.

21. The article of manufacture of claim 15, wherein the indication is made to the server device, and wherein the program instructions cause the client device to perform operations further comprising:

receiving, from the server device, an instruction to uninstall the application, wherein the instruction is sent as a result of the client device making the indication to the server device; and in response to receiving the instruction, uninstalling the application.

22. The article of manufacture of claim 15, wherein the predetermined fixed time period is about 10 minutes or less.

23. The article of manufacture of claim 22, wherein the predetermined fixed time period is about 1 minute or less.

24. An article of manufacture including a non-transitory computer-readable medium, having stored thereon program instructions that, upon execution by a server device, cause the server device to perform operations comprising:

receiving, from a client device, an indication that an application is exhibiting anomalous behavior, wherein the application is installed on the client device, and wherein the anomalous behavior involves the application declaring a reciprocal intended use of the contact information such that the application will use a read function of a contact list application programming interface and use a write function of the contact list application programming interface, and within a predetermined fixed time period, (i) the application using the read function of the contact list application programming interface to read at least part of the contact information, and (ii) the application not using the write function of the contact list application programming interface to write a threshold extent of data to the contact information;

after receiving the indication, determining that the server device has received indications of the application behaving anomalously from a threshold number of at least two client devices; and in response to determining that the server device has received indications of the application behaving anomalously from the threshold number of at least two client devices, transmitting, to a computing device, an instruction regarding the application.

25. The article of manufacture of claim 24, wherein the computing device is the client device, and wherein the instruction instructs the client device to disable the application.

26. The article of manufacture of claim 24, wherein the computing device is the client device, and wherein the instruction instructs the client device to uninstall the application.

27. The article of manufacture of claim 24, wherein the computing device is an application server device, wherein the application server device allows client devices to download applications from the application server device, and wherein the instruction instructs the application server device to disable downloads of the application.

28. The article of manufacture of claim 24, wherein the computing device is an application server device, wherein the application server device allows client devices to download applications from the application server device, and wherein the instruction instructs the application server device to warn each client device attempting to download the application that the application exhibits anomalous behavior.

* * * * *